(12) United States Patent
Endo et al.

(10) Patent No.: US 12,343,759 B2
(45) Date of Patent: Jul. 1, 2025

(54) VIBRATION STRUCTURE

(71) Applicant: Murata Manufacturing Co., Ltd., Nagaokakyo (JP)

(72) Inventors: Jun Endo, Nagaokakyo (JP); Shozo Otera, Nagaokakyo (JP); Yutaka Ishiura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 856 days.

(21) Appl. No.: 17/546,612

(22) Filed: Dec. 9, 2021

(65) Prior Publication Data

US 2022/0097098 A1 Mar. 31, 2022

Related U.S. Application Data

(63) Continuation of application No. PCT/JP2020/039202, filed on Oct. 19, 2020.

(30) Foreign Application Priority Data

Oct. 23, 2019 (JP) .................................. 2019-192473

(51) Int. Cl.
*B06B 1/06* (2006.01)
*G06F 3/01* (2006.01)

(52) U.S. Cl.
CPC ............ *B06B 1/0603* (2013.01); *G06F 3/016* (2013.01)

(58) Field of Classification Search
CPC ..................................................... B06B 1/0603
See application file for complete search history.

(56) References Cited

U.S. PATENT DOCUMENTS

| 9,350,837 | B2 | 5/2016 | Suzuki et al. |
| 2014/0342783 | A1* | 11/2014 | Suzuki ................ H04M 1/0266 455/569.1 |
| 2017/0244340 | A1* | 8/2017 | Ichimura ............ H10N 30/2041 |
| 2019/0265795 | A1* | 8/2019 | Ishii ........................ H10N 30/88 |
| 2021/0239553 | A1* | 8/2021 | Akhbari ............... H10N 30/857 |

FOREIGN PATENT DOCUMENTS

| JP | 2008186188 | * | 8/2008 |
| JP | 2008186188 | A | 8/2008 |
| JP | WO 2012115140 | * | 8/2012 |
| JP | 2013255212 | A | 12/2013 |
| JP | 6237959 | B2 | 11/2017 |
| WO | 2012115140 | A1 | 8/2012 |

OTHER PUBLICATIONS

English translation of WO 2012115140 (Year: 2012).*
English translation of JP 2008186188 (Year: 2008).*
International Search Report issued in PCT/JP2020/039202, dated Dec. 22, 2020.
Written Opinion of the International Search Report issued in PCT/JP2020/039202, dated Dec. 22, 2020.

* cited by examiner

*Primary Examiner* — Bryan P Gordon
(74) *Attorney, Agent, or Firm* — ArentFox Schiff LLP (57) ABSTRACT

A vibration structure that includes a member having a vibrator that vibrates along a plane direction; a housing that holds the member; and a cushioning material connecting the housing to the member, in which a thickness of the cushioning material in a direction orthogonal to a plane direction of the housing is greater than a length of a gap between the member and the housing.

14 Claims, 9 Drawing Sheets

VIBRATION STRUCTURE

CROSS REFERENCE TO RELATED APPLICATIONS

The present application is a continuation of International application No. PCT/JP2020/039202, filed Oct. 19, 2020, which claims priority to Japanese Patent Application No. 2019-192473, filed Oct. 23, 2019, the entire contents of each of which are incorporated herein by reference.

FIELD OF THE INVENTION

The present invention relates to a vibration structure that generates vibration.

BACKGROUND OF THE INVENTION

In recent years, there has been proposed a tactile sense presentation device that transmits vibration to a user when the user touches a touch pad or the like to cause the user to have an actual feeling of operation through the touch pad or the like. Such a conventional vibration device is disposed on top of a housing of an electronic device or the like in an overlapping manner.

For example, Patent Document 1 (JP 6237959 B2) proposes a vibration device that gives tactile feedback to a user by using a piezoelectric film.

SUMMARY OF THE INVENTION

When the vibration device is disposed on top of a housing of an electronic device or the like in an overlapping manner, a portion where the vibration device is disposed becomes bulky due to the thickness of a member connecting the vibration device and the housing in addition to the thickness of the vibration device itself. Here, when the member connecting the vibration device and the housing is thinned to suppress the bulkiness, the housing easily restrains the vibration device. Thus, vibration of the vibration device is impeded.

In view of the above, an object of the present invention is to provide a vibration structure in which the bulkiness is suppressed while the restraint by the housing is suppressed when the vibration structure is disposed in an electronic device or the like.

A vibration structure of the present invention includes member having a vibrator configured to vibrate along a plane direction; a housing configured to hold the member; and a cushioning material connecting the housing to the member, in which a thickness of the cushioning material in a direction orthogonal to a plane direction of the housing is greater than a length of a gap between the member and the housing.

In this configuration, members including the vibrator held by the housing are connected to the housing with the cushioning material interposed therebetween. Since the thickness of the cushioning material is greater than the length of the gap between the member held by the housing and the housing, at least a part of the cushioning material enters the housing side. For example, a cutout is provided in the housing, and a part of the cushioning material is fitted into the cutout. Alternatively, when the housing has a cavity, the cushioning material may be connected to a side surface of the housing. The thickness of the entire vibration structure can be reduced by the amount of the cushioning material entering the housing side. As the thickness of the cushioning material in the direction orthogonal to the plane direction of the vibrator increases, it becomes difficult for the cushioning material to impede vibration of the vibrator. Thus, the cushioning material can suppress the restraint by the housing. Therefore, the whole vibration structure can be thinned and the bulkiness thereof can be suppressed while the restraint by the housing is suppressed.

According to the present invention, in the case where the vibration structure is disposed in an electronic device or the like, the bulkiness of the vibration structure can be suppressed while the restraint by the housing is suppressed.

DETAILED DESCRIPTION OF THE INVENTION

Figure 1A:
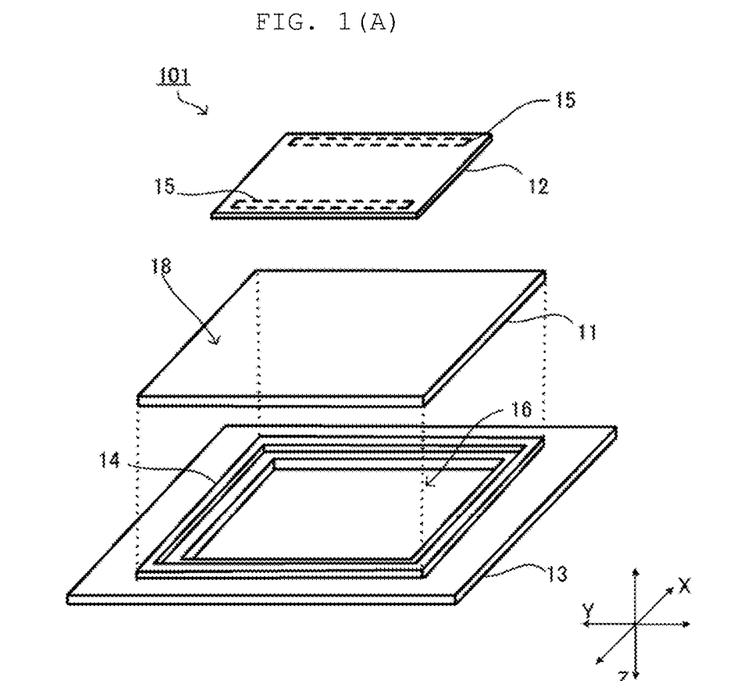
FIG. 1(A) is an exploded perspective view of a vibration structure 101 according to a first embodiment.
Figure 1B:
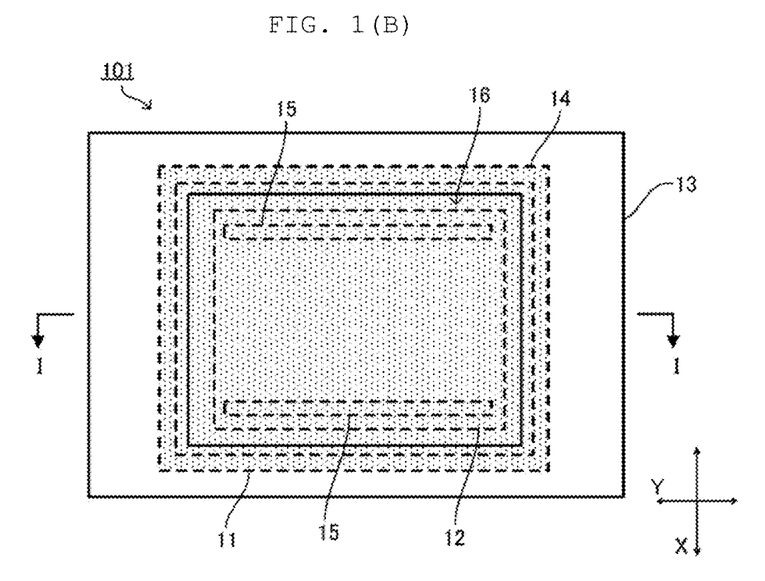
FIG. 1(B) is a plan view of the vibration structure 101.
Figure 2A:
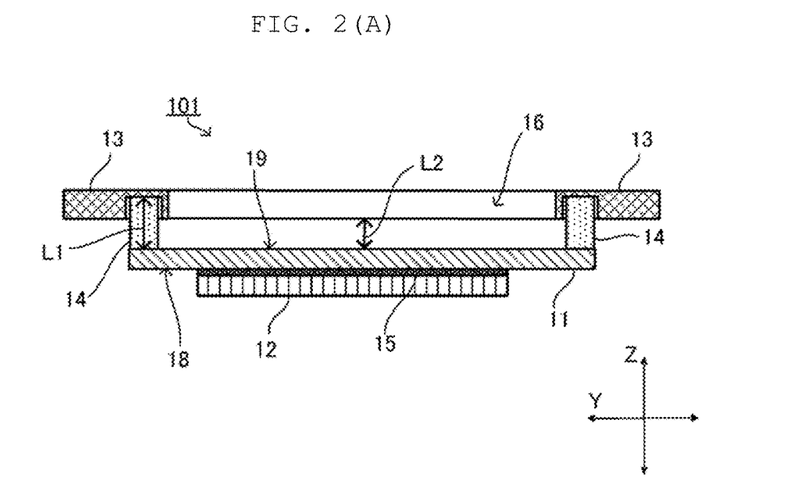
FIG. 2(A) is a sectional view taken along line I-I illustrated in FIG. 1(B)
Figure 2B:
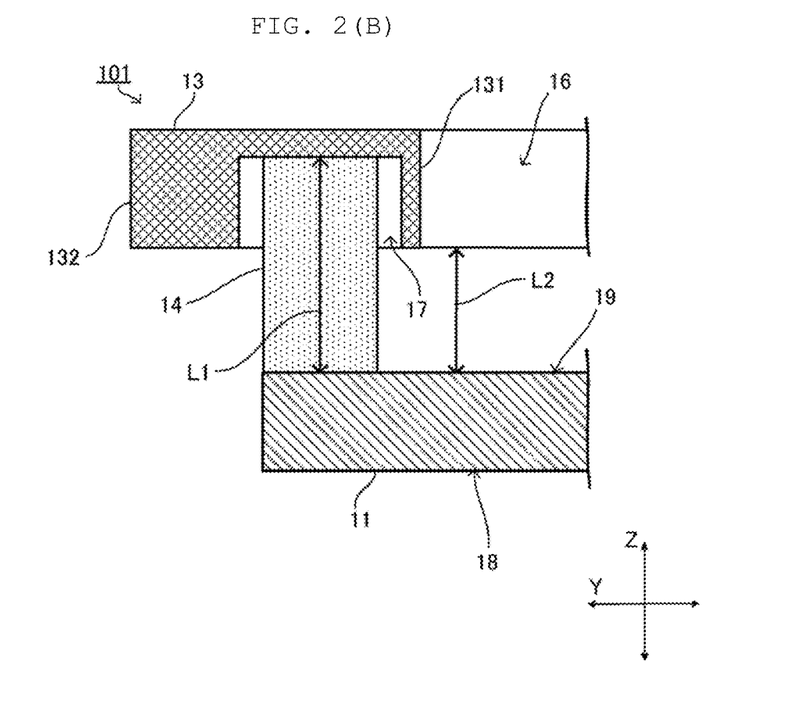
FIG. 2(B) is an enlarged view of a part of FIG. 2(A).

FIG. 1(A) is an exploded perspective view of a vibration structure 101 according to a first embodiment, and FIG. 1(B) is a plan view of the vibration structure 101 viewed from a +Z direction toward a −Z direction. FIG. 2(A) is a sectional view taken along line I-I illustrated in FIG. 1(B), and FIG. 2(B) is an enlarged view of a part of FIG. 2(A). Hereinafter, each drawing illustrates only a part of a housing 13 of an electronic device and omits wiring. Note that, in FIG. 1(B), members overlapping the housing 13, when the housing 13 is viewed in a transmissive manner, are indicated by broken lines, and a region where a substrate 11 is present is indicated by stippling.

As illustrated in FIGS. 1(A), 1(B), and 2(A), the vibration structure 101 of the present embodiment includes the substrate 11, a vibrator 12, the housing 13, a cushion material 14, and a double-sided tape 15. In FIGS. 1(A) and 1(B), description will be made on the assumption that a width direction (lateral direction) of the vibration structure 101 is an X-axis direction, a length direction (vertical direction) is a Y-axis direction, and a thickness direction is a Z-axis direction. Note that an XY-plane direction corresponds to a "plane direction" in the present description, and a Z-axis direction corresponds to a "direction orthogonal to the plane direction" in the present description.

The substrate 11 is a flat plate having a first main surface 18 and a second main surface 19. The first main surface 18 and the second main surface 19 have a rectangular shape in a plan view. The second main surface 19 is a touch panel that receives a user's touch operation when the vibration structure 101 is disposed in the housing 13 of the electronic device. The substrate 11 includes an electrostatic capacitance sensor (not illustrated) for detecting a touch operation. Note that the substrate 11 is an example of a "flat plate" in the present description.

The vibrator 12 is connected to the first main surface 18 of the substrate 11. The vibrator 12 is connected to the substrate 11 with the double-sided tape 15 interposed therebetween. The double-sided tape 15 is an example of a "connecting member" in the present description. Note that the connecting member may be anything other than the double-sided tape as long as the connecting member connects the vibrator 12 to the substrate 11. The vibrator 12 is connected to a drive circuit (not illustrated) and constitutes a vibration unit together with the substrate 11.

Figure 3A:
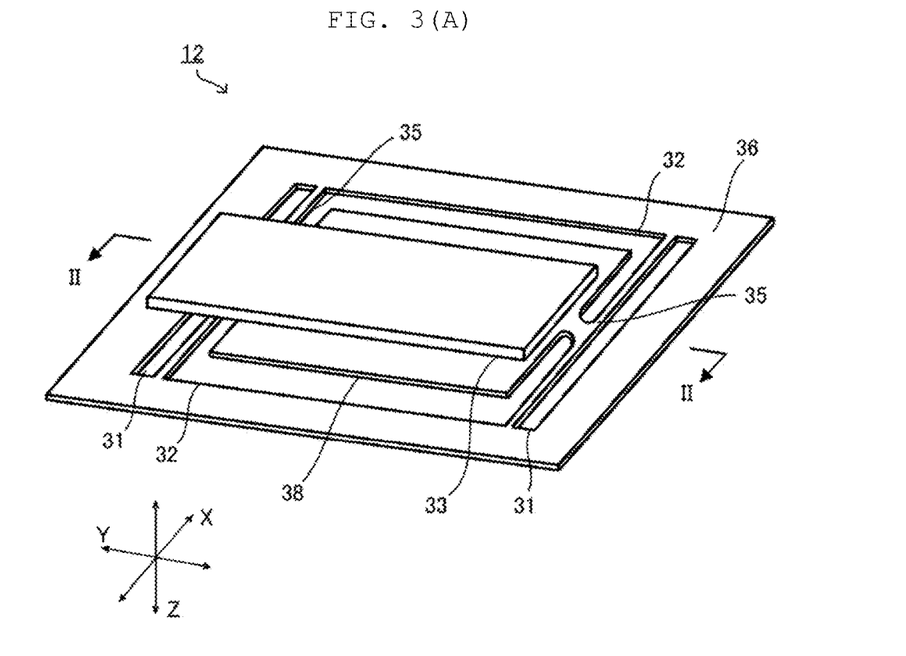
FIG. 3(A) is a rear perspective view of a vibrator 12.
Figure 3B:
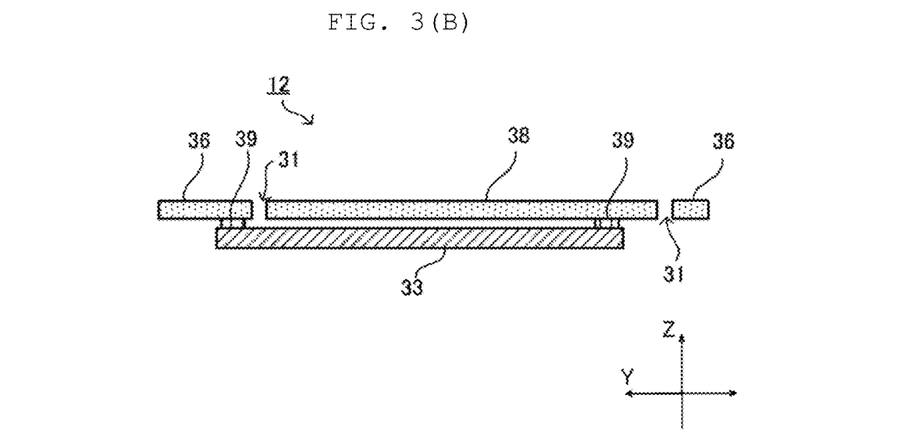
FIG. 3(B) is a sectional view taken along line II-II illustrated in FIG. 3(A).

FIG. 3(A) is a rear perspective view of the vibrator 12, and FIG. 3(B) is a sectional view taken along line II-II illustrated in FIG. 3(A). As illustrated in FIG. 3(A), the vibrator 12 has a substantially flat-plate shape. The vibrator 12 has a substantially rectangular shape in a plan view. The area of the vibrator 12 is smaller than the area of the first main surface 18 of the substrate 11. A short direction of the vibrator 12 is parallel to the X-axis direction, and a long direction of the vibrator 12 is parallel to the Y-axis direction.

As illustrated in FIGS. 3(A) and 3(B), the vibrator 12 includes a vibration film 33, a support portion 35, a frame member 36, a vibration portion 38, and a connecting portion 39.

The frame member 36 has a rectangular shape in a plan view. The frame member 36 has two first openings 31 and two second openings 32. The first opening 31 is disposed on each end side in the Y-axis direction which is a long direction of the frame member 36. The second opening 32 is disposed on each end side in the X-axis direction which is a short direction of the frame member 36.

The first opening 31 has a substantially rectangular shape and is long along the X-axis direction. The second opening 32 is a substantially rectangular opening that is long along the Y-axis direction. Further, both ends of the second opening 32 in the Y-axis direction are further extended in a rectangular shape toward the central axis (line II-II in the drawing) of the frame member 36.

The vibration portion 38 has a rectangular shape in a plan view, and is disposed on an inner side of the frame member 36. The area of the vibration portion 38 is smaller than the area surrounded by the frame member 36.

The support portion 35 connects the vibration portion 38 and the frame member 36. The support portion 35 supports the vibration portion 38 on the frame member 36. In this example, the support portion 35 has a rectangular shape that is long along the X-axis direction, and holds the vibration portion 38 at each end portion of the vibration portion 38 in the Y-axis direction. A length of the support portion 35 in the X-axis direction is greater than a length of the support portion 35 in the Y-axis direction.

The frame member 36, the vibration portion 38, and the support portion 35 are formed using the same material (for example, acrylic resin, PET, polycarbonate, glass epoxy, FRP, metal, glass, or the like). The metal includes, for example, stainless used steel (SUS), and may be insulated by coating with resin such as polyimide as necessary.

The frame member 36, the vibration portion 38, and the support portion 35 are formed by punching a single rectangular plate material along the shapes of the first openings 31 and the second openings 32. The frame member 36, the vibration portion 38, and the support portion 35 may be members different one another, but can be easily manufactured by being formed as the same member. In addition, by the frame member 36, the vibration portion 38, and the support portion 35 being formed as the same member, another member such as rubber (member having creep deterioration) does not need to use for supporting the vibration portion 38. Thus, the frame member 36 can stably hold the vibration portion 38 for a long period of time.

The vibration film 33 is connected to the frame member 36 and the vibration portion 38 with the connecting portion 39 interposed between the vibration film 33 and frame member 36 and between the vibration film 33 and the vibration portion 38. A first end in a long direction of the vibration film 33 is connected to a first end of the frame member 36 in the Y-axis direction. A second end of the vibration film 33 is connected to a second end of the vibration portion 38 in the Y-axis direction. An insulating and adhesive material is used for the connecting portion 39. The vibration film 33 is connected to the frame member 36 with the connecting portion 39 interposed therebetween by, for example, heat welding.

The connecting portion 39 has a rectangular shape that is long along the short direction of the frame member 36 in a plan view. The connecting portion 39 has a certain thickness, and connects the vibration film 33 and the vibration portion 38 at a position separated from each other to a certain extent so that the vibration film 33 is not brought into contact with the vibration portion 38. As a result, since the electrodes (not illustrated) provided on both main surfaces of the vibration film 33 do not come into contact with the vibration portion 38, the electrodes are not scraped when the vibration film 33 expands and contracts and then the vibration portion 38 vibrates.

The vibration film 33 is an example of a piezoelectric film that vibrates by being deformed in a plane direction when a voltage is applied. The vibration film 33 has a rectangular shape that is long along the long direction of the frame member 36 in a plan view. The vibration film 33 contains, for example, polyvinylidene fluoride (PVDF). Alternatively, the vibration film 33 may be contain a chiral polymer. As the chiral polymer, for example, poly-L-lactic acid (PLLA) or poly-D-lactic acid (PDLA) is used.

In a case where PVDF is used for the vibration film 33, the electronic device including the vibration member in this example can be vibrated similarly under any humidity environment since PVDF has water resistance.

Alternatively, in a case where PLLA is used for the vibration film 33, the internal situation of a device can be visually recognized when the electrode and the vibration portion to be added to PLLA are made using a highly transmissive material, since PLLA is a highly transmissive material. As a result, the device can be easily manufactured. Further, since PLLA has no pyroelectricity, similar vibration can be caused under any temperature environment. In a case where the vibration film 33 is configured with PLLA, the vibration film 33 can expand and contract along the Y-axis direction by being cut so that each outer peripheral side is approximately 45° with respect to the expanding direction.

The drive circuit (not illustrated) applies a voltage to the vibration film 33 to expand and contract the vibration film 33. The vibration film 33 deforms in the plane direction when a voltage is applied. Specifically, the vibration film 33 expands and contracts in the Y-axis direction when a voltage is applied. When the vibration film 33 expands and contracts in the Y-axis direction, the vibration portion 38 vibrates in the Y-axis direction. That is, the vibrator 12 vibrates in the Y-axis direction. As a result, vibration generated in the vibrator 12 is transmitted to the user via the substrate 11.

Note that the vibrator 12 only needs to vibrate along the XY-plane direction, and the method of vibrating the vibrator 12 is not limited to the above example. For vibrating the vibrator 12, a motor or the like may be used, for example.

The housing 13 has a rectangular shape in a plan view. The housing 13 includes a cavity 16. The housing 13 contains, for example, metal such as aluminum.

The cavity 16 has a rectangular shape in a plan view. The cavity 16 is formed to have an area smaller than that of the substrate 11 in a plan view. The housing 13 has the cavity 16 formed at a position overlapping the substrate 11 in a plan view. The housing 13 is connected to the second main surface 19 of the substrate 11 with the cushion material 14 interposed therebetween. The user can directly touch the substrate 11 through the space surrounded by the cavity 16 and the cushion material 14. Note that, in the present embodiment, the substrate 11 is an example of "a member held by the housing" in the present description.

The cushion material 14 is formed using a material that is more easily deformed when an external force is applied compared to a material of the housing 13 and the substrate 11. Thus, the cushion material 14 suppresses the restraint on the substrate 11 by the housing 13 when the substrate 11 is connected to the housing 13. Therefore, the cushion material 14 connects the substrate 11 to the housing 13 without impeding the vibration of the substrate 11. The cushion material 14 is an example of a "cushioning material" in the present description.

The cushion material 14 is formed in a frame shape. The outer shape of the cushion material 14 is a rectangular frame shape in a plan view. The cushion material 14 is disposed at a position separated from the cavity 16 by a predetermined distance in a plan view. The outer periphery of the cushion material 14 overlaps the outer periphery of the substrate 11 in a plan view. Note that the cushion material 14 only needs to, in part, overlap the substrate 11 in a plan view.

The cushion material 14 is preferably disposed so as to surround the cavity 16 in a plan view. Further, the cushion material 14 closes a gap between the housing 13 and the substrate 11. Thus, when water splashes on the cavity 16 of the housing 13, the cushion material 14 can prevent water from entering the internal space on the housing 13 side in a case where the cushion material is made using a material that does not allow water to pass, such as rubber.

As illustrated in FIGS. 2(A) and 2(B), the thickness L1 of the cushion material 14 in the Z-axis direction in FIG. 2(B) is larger than the length L2 of the gap between the second main surface 19 of the substrate 11 and the housing 13. That is, the thickness L1 of the cushion material 14 in the Z-axis direction can be ensured to be equal to or greater than the length L2 of the gap between the second main surface 19 of the substrate 11 and the housing 13. As the thickness L1 of the cushion material 14 in the Z-axis direction is increased, the flexibility in the plane direction increases. As the flexibility of the cushion material 14 in the plane direction increases, the substrate 11 more easily vibrates. Thus, the cushion material 14 can suppress the restraint on the substrate 11 by the housing 13.

A recess 17 is formed at a position where the housing 13 is in contact with the cushion material 14. That is, the recess 17 is formed at a position separated by a predetermined distance from an end surface 131 of the housing 13 forming the cavity 16 toward an end surface 132 on an outer side of the housing 13 in a plan view. The recess 17 is an example of a "cutout" in the present description.

The recess 17 is a groove having a rectangular section when taken along an XZ plane or a YZ plane, and has a structure in which a part of a surface of the housing 13 facing the substrate 11 is recessed toward the inside of the housing 13. A section of the recess 17 taken along the XY plane is formed to be slightly larger than a section of the cushion material 14 taken along the XY plane. Thus, the cushion material 14 can enter the recess 17 easily. In addition, since the cushion material 14 is not restrained by the side surface of the recess 17, movement with respect to the XY plane is not suppressed.

Since the recess 17 is formed, the cushion material 14 is connected to the housing 13 in a state where a part of the cushion material 14 enters the housing 13. The thickness of the entire vibration structure 101 in the Z-axis direction is reduced by the amount of the cushion material 14 entering the housing 13. As a result, as compared with a case where the recess 17 does not enter the housing 13, the thickness of the entire vibration structure 101 in the Z-axis direction can be reduced, and the bulkiness of the vibration structure 101 can be suppressed.

Note that, in the present embodiment, the cushion material 14 has a frame shape surrounding the cavity 16 in a plan view, but is not limited to this aspect. The cushion material 14 only needs to be disposed at least at a part of the periphery of the cavity 16.

For example, the cushion material 14 may be disposed at one or more locations on the periphery of the cavity 16.

Note that, in the present embodiment, the housing 13 is a housing of an electronic device in which the vibration structure 101 is installed, but the present invention is not limited to this aspect.

Figure 4A:
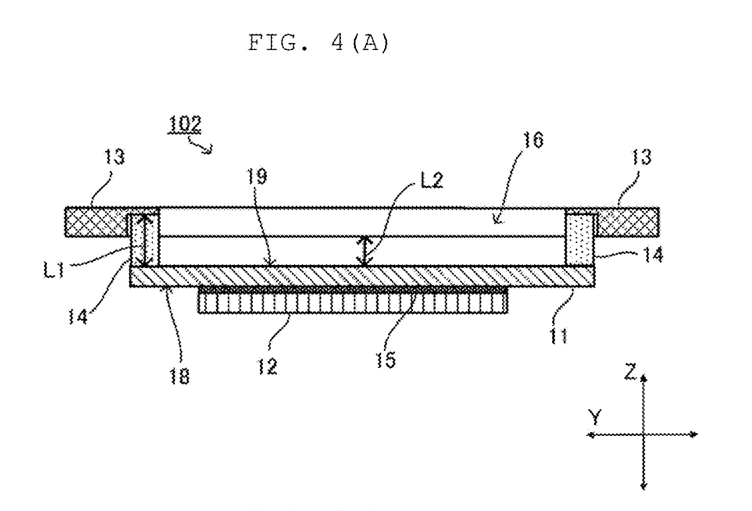
FIG. 4(A) is a sectional view of a vibration structure 102 according to a second embodiment.
Figure 4B:
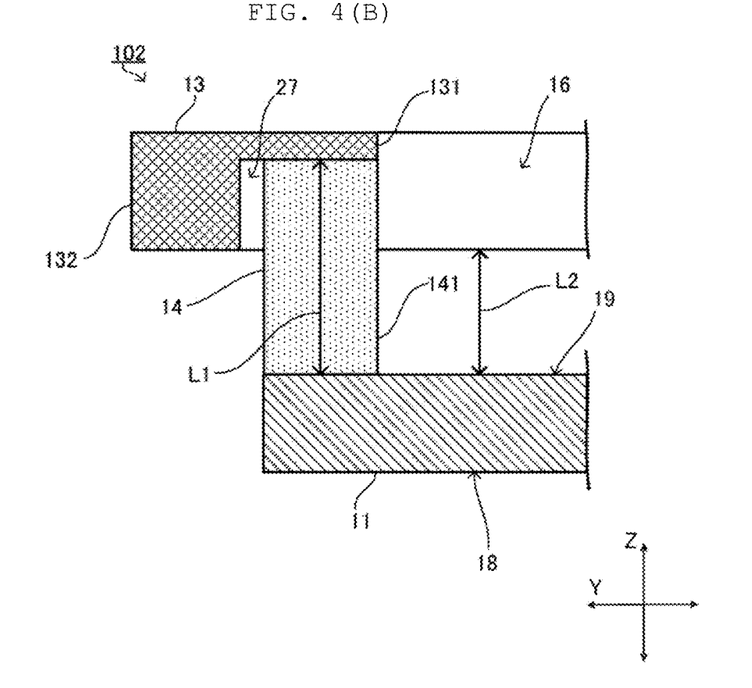
FIG. 4(B) is an enlarged view of a part of FIG. 4(A).

FIG. 4(A) is a sectional view of a vibration structure 102 according to a second embodiment, and FIG. 4(B) is an enlarged view of a part of FIG. 4(A). In the description of the second embodiment, only portions different from the first embodiment will be described, and the rest will be omitted.

As illustrated in FIG. 4(A), the vibration structure 102 is different from the vibration structure 101 in that a step 27 is formed, instead of the recess 17, in the housing 13 around the cavity 16.

Other configurations are the same as those of the vibration structure 101. In the vibration structure 102, the step 27 is formed along the cavity 16 in a plan view. That is, the step 27 has a shape in which a part of the end surface 131 on an inner side of the housing 13 is recessed from the end surface 131 toward the end surface 132 on the outer side of the housing 13 in a plan view. The step 27 is an example of a "cutout" in the present description.

In the vibration structure 102, the cushion material 14 is disposed along the outside of the cavity 16 in a plan view. Since a side surface 141 of the cushion material 14 is not restrained by the housing 13, movement of the cushion material 14 with respect to the XY plane is not suppressed. Further, when the cushion material 14 is deformed, the side surface 141 on an inner side of the cushion material 14 does not come into contact with the housing 13. Thus, the degree of flexibility in movement of the cushion material 14 with respect to the XY plane increases. Further, the cushion material 14 is connected to the housing 13 in a state of the cushion material 14 entering the housing 13 by the step 27. Thus, the thickness of the entire vibration structure 102 in the Z-axis direction can be reduced as compared with a case where the step 27 is not formed in the housing 13. Therefore, in the vibration structure 102, the bulkiness can be suppressed while the restraint on the substrate 11 by the housing 13 can be suppressed.

Figure 5A:
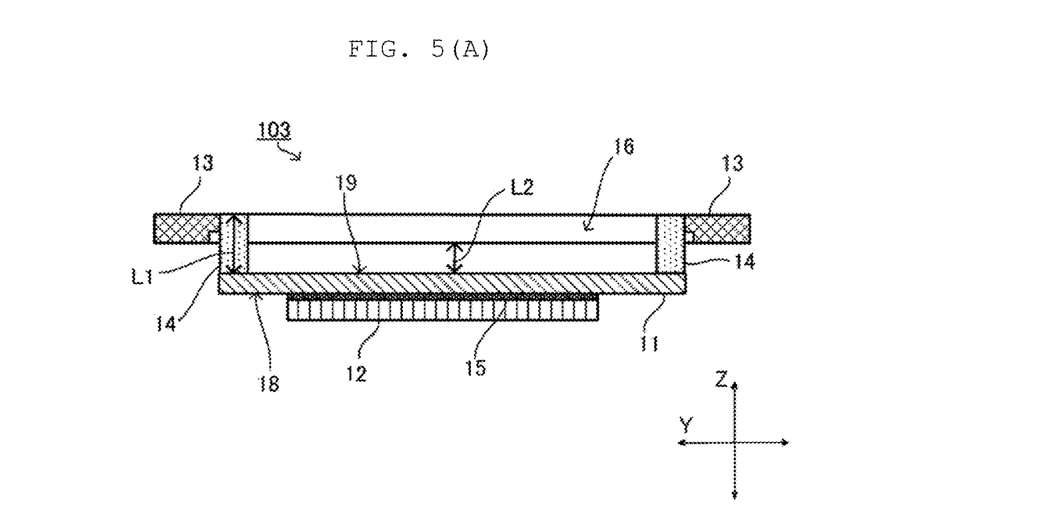
FIG. 5(A) is a sectional view of a vibration structure 103 according to a third embodiment.
Figure 5B:
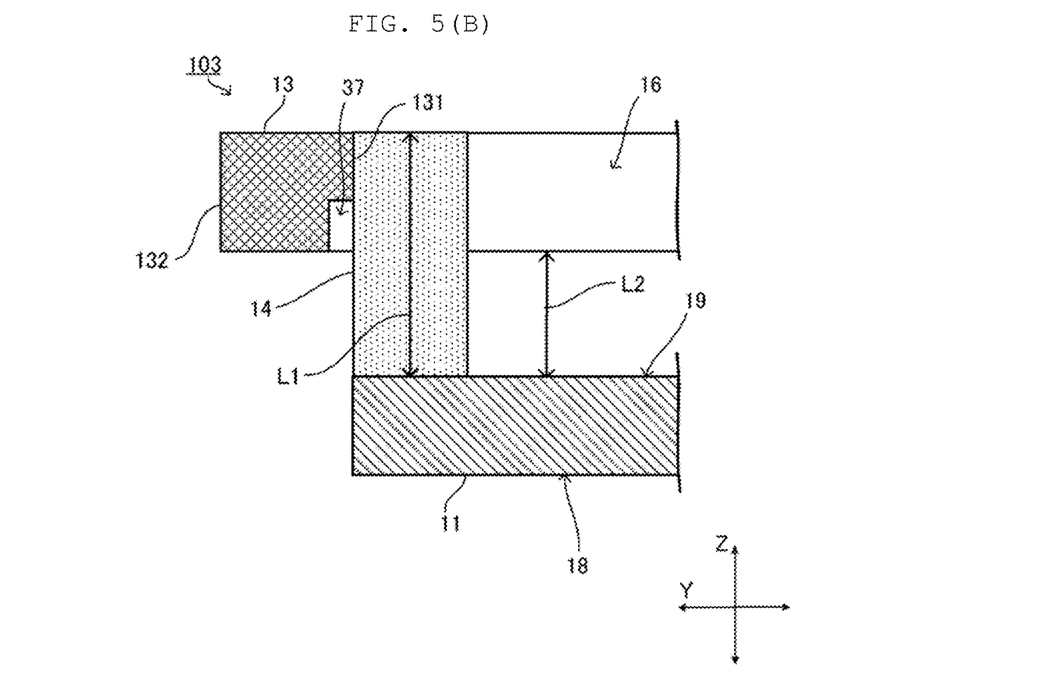
FIG. 5(B) is an enlarged view of a part of FIG. 5(A).

FIG. 5(A) is a sectional view of a vibration structure 103 according to a third embodiment, and FIG. 5(B) is an enlarged view of a part of FIG. 5(A). In the description of the third embodiment, only portions different from the second embodiment will be described, and the rest will be omitted.

As illustrated in FIG. 5(A), the vibration structure 103 is different from the vibration structure 102 in that a step 37 is formed, instead of the step 27, in the housing 13, and is different in arrangement of the cushion material 14 with respect to the housing 13. Other configurations are the same as those of the vibration structure 102. In the vibration structure 103, the step 37 is formed on the end surface 131 on the inner side of the housing 13 in a plan view. The step 37 is formed along the cavity 16 in a plan view. That is, the step 37 has a shape in which a part of the end surface 131 on the inner side of the housing 13 is recessed from the end surface 131 toward the end surface 132 on the outer side of the housing 13 in a plan view.

In the vibration structure 103, the cushion material 14 is connected to the end surface 131 on the inner side of the housing 13. That is, the cushion material 14 is disposed along the inside of the cavity 16 in a plan view. The cushion material 14 is not connected to a portion where the step 37 is provided, with respect to the end surface 131 on the inner side of the housing 13. The cushion material 14 is not restrained by the housing 13 by the amount equal to the height of the step 37 in the Z-axis direction. Thus, also in the vibration structure 103, the bulkiness can be suppressed while the restraint on the substrate 11 by the housing 13 can be suppressed.

Figure 6A:
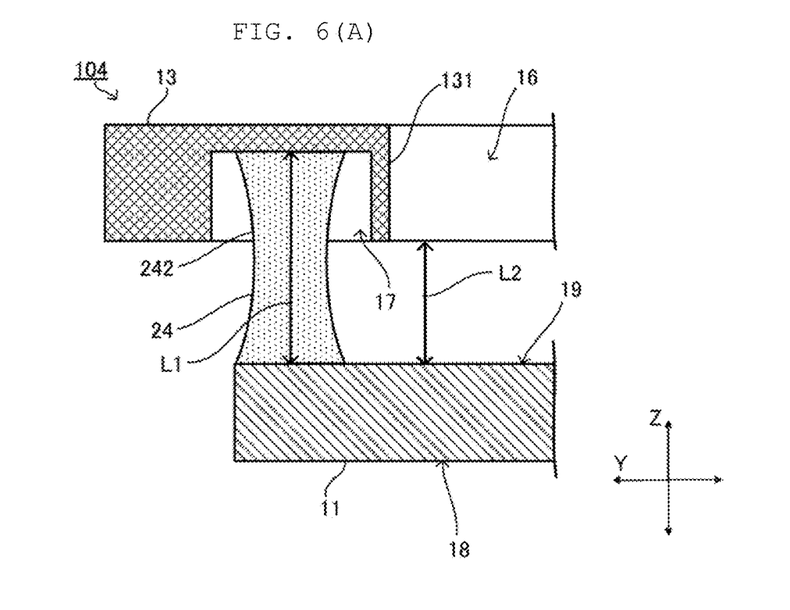
FIG. 6(A) is a diagram for explaining a first modification of the vibration structure 101.
Figure 6B:
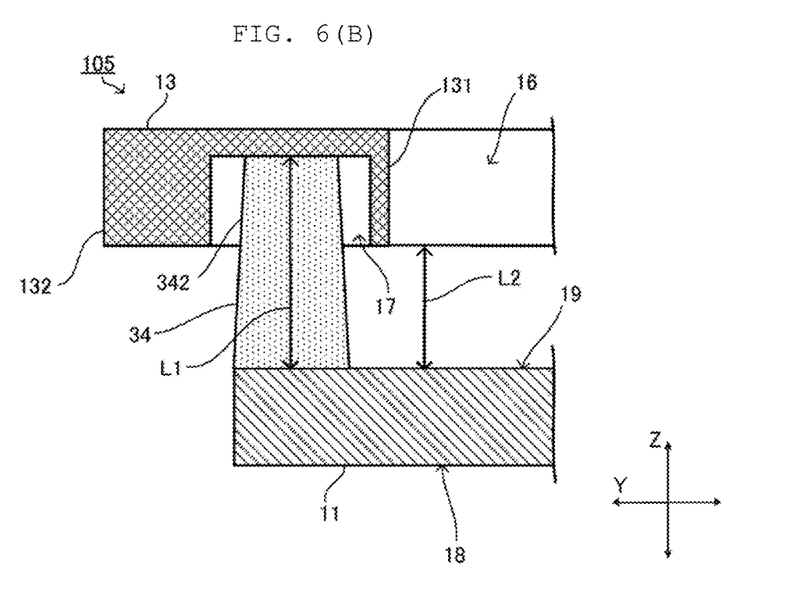
FIG. 6(B) is a diagram for explaining second modification of the vibration structure 101.
Figure 7:
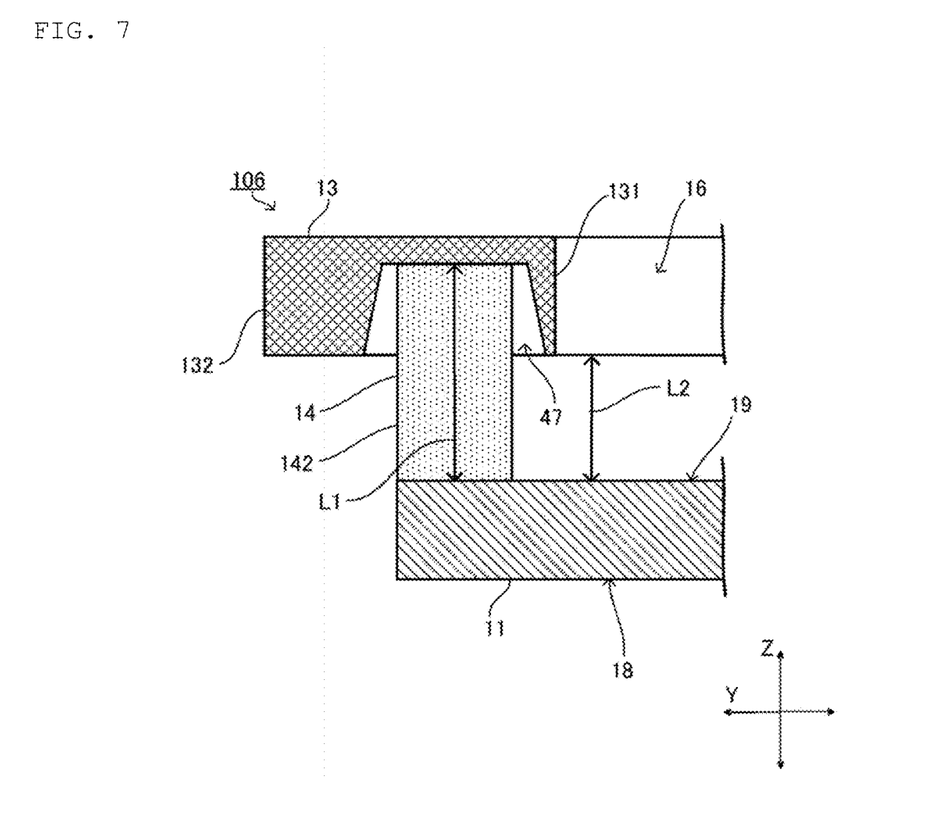
FIG. 7 is a diagram for explaining a third modification of the vibration structure 101.

FIG. 6(A) is a diagram for explaining a vibration structure 104 according to first modification of the vibration structure 101, and FIG. 6(B) is a diagram for explaining a vibration structure 105 according to a second modification of the vibration structure 101. FIG. 7 is a diagram for explaining a vibration structure 106 according to a third modification of the vibration structure 101. Note that, in the description of the first modification and the third modification, only portions different from the vibration structure 101 according to the first embodiment will be described, and the rest will be omitted. Further, in the description of the second modification, only portions different from the vibration structure 104 according to the first modification will be described, and the rest will be omitted.

As illustrated in FIG. 6(A), the vibration structure 104 is different from the vibration structure 101 in that a cushion material 24 is used instead of the cushion material 14, and the other configurations are the same. In the vibration structure 104, the sectional area of the cushion material 24 on the XY plane changes along the Z-axis direction. The cushion material 24 is thick at both ends and thin at the center along the Z-axis direction. As the cushion material 24 becomes thinner, the flexibility in the plane direction increases. When the flexibility of the cushion material 24 increases, the cushion material 24 easily follows the vibration of the substrate 11. Thus, the cushion material 24 can further suppress the restraint on the substrate 11 by the housing 13.

In addition, since the distance from the side surface of the housing 13 formed by the recess 17 to a side surface 242 of the cushion material 24 increases, it is more difficult for the side surface 242 to come into contact with the housing 13.

This increases the degree of flexibility in movement of the cushion material 24 with respect to the XY plane. When the degree of flexibility in movement of the cushion material 24 with respect to the XY plane increases, the cushion material 24 easily follows the vibration of the substrate 11. Thus, the cushion material 24 can further suppress the restraint on the substrate 11 by the housing 13.

Further, both ends of the cushion material 24 in the Z-axis direction are formed thick. As a result, the area in which the cushion material 24 and the housing 13 are connected, and the area in which the cushion material 24 and the substrate 11 are connected increase. Therefore, the cushion material 24 can be firmly connected to the housing 13 and the substrate 11.

As illustrated in FIG. 6(B), the vibration structure 105 is different from the vibration structure 104 in that a cushion material 34 is used instead of the cushion material 24, and the other configurations are the same. In the vibration structure 105, the cushion material 34 has a tapered shape in which the sectional area on the XY plane changes along the Z-axis direction. The cushion material 34 is thick on the substrate 11 side and thin on the housing 13 side along the Z-axis direction. Note that the cushion material 34 may be thick on the housing 13 side and thin on the substrate 11 side along the Z-axis direction.

Further, a shape in which the cushion material 34 is thick on the substrate 11 side and thin on the housing 13 side along the Z-axis direction is preferable as compared with a shape in which the cushion material 34 is thick on the housing 13 side and thin on the substrate 11 side along the Z-axis direction. Since the cushion material 34 is thin on the housing 13 side along the Z-axis direction, the distance from the side surface of the housing 13 formed by the recess 17 to a side surface 342 of the cushion material 34 increases. Thus, it is more difficult for the cushion material 34 to come into contact with the housing 13. Therefore, the degree of flexibility in movement of the cushion material 34 with respect to the XY plane increases. When the degree of flexibility in movement of the cushion material 34 with respect to the XY plane increases, the cushion material 34 easily follows the vibration of the substrate 11. Thus, the cushion material 34 can further suppress the restraint on the substrate 11 by the housing 13.

As illustrated in FIG. 7, the vibration structure 106 is different from the vibration structure 101 in that a recess 47 is formed instead of the recess 17, and the other configurations are the same. In the vibration structure 106, the recess 47 is a groove whose section taken along the XZ plane or the YZ plane expands from the housing 13 side toward the substrate 11. The recess 47 has a structure in which a part of a surface of the housing 13 facing the substrate 11 is recessed toward the inside of the housing 13. The section of the recess 47 taken along the XY plane has a shape expanding from the inside of the housing 13 toward the outside of the housing 13, that is, toward the surface of the housing 13 facing the substrate 11. Thus, a distance from the side surface of the housing 13 formed by the recess 47 to a side surface 142 of the cushion material 14 increases toward the outside of the housing 13, and thus, it is difficult for the side surface to come into contact with the housing 13. Therefore, the degree of flexibility in movement of the cushion material 14 with respect to the XY plane increases. When the degree of flexibility in movement of the cushion material 14 with respect to the XY plane increases, the cushion material 14 easily follows the vibration of the substrate 11. Thus, the recess 47 can further suppress the restraint on the substrate 11 by the housing 13.

Figure 8A:
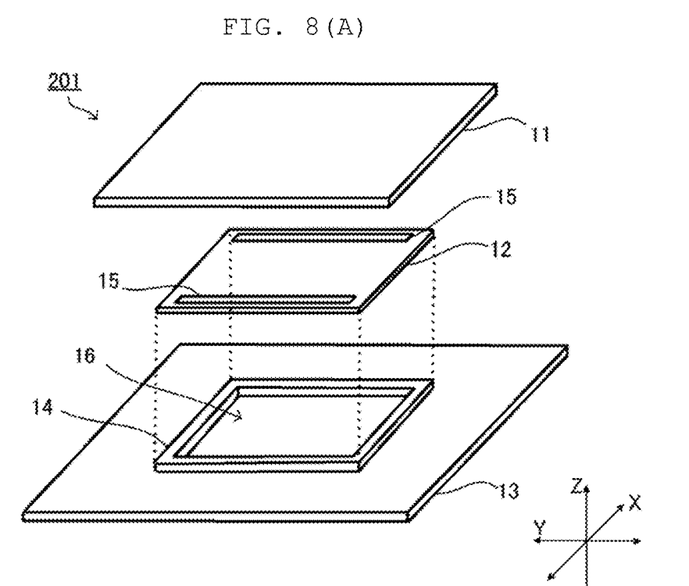
FIG. 8(A) is an exploded perspective view of a vibration structure 201 according to a fourth embodiment.
Figure 8B:
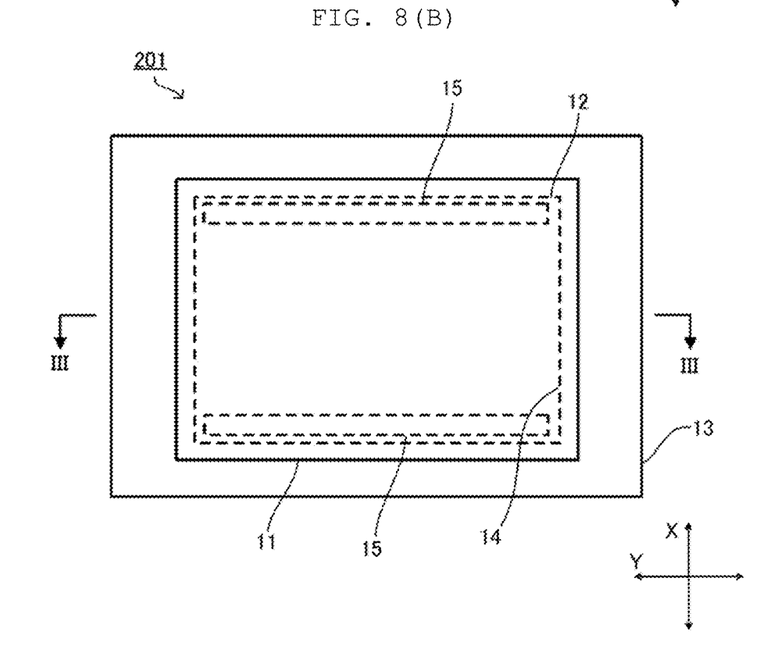
FIG. 8(B) is a plan view of the vibration structure 201.
Figure 9A:
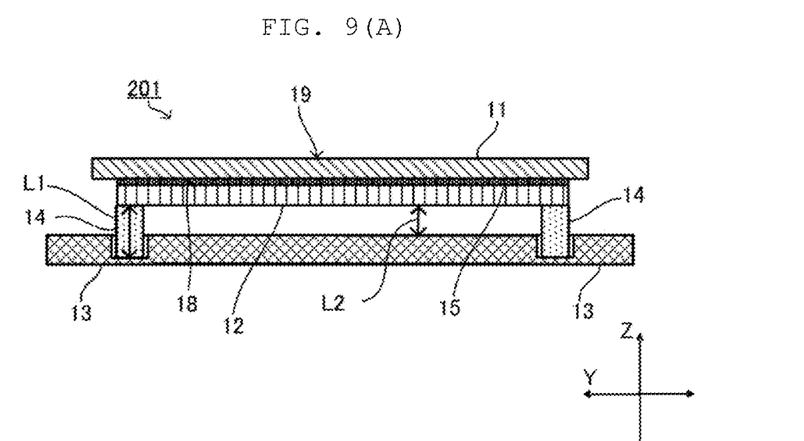
FIG. 9(A) is a sectional view taken along line III-III illustrated in FIG. 8(B)
Figure 9B:
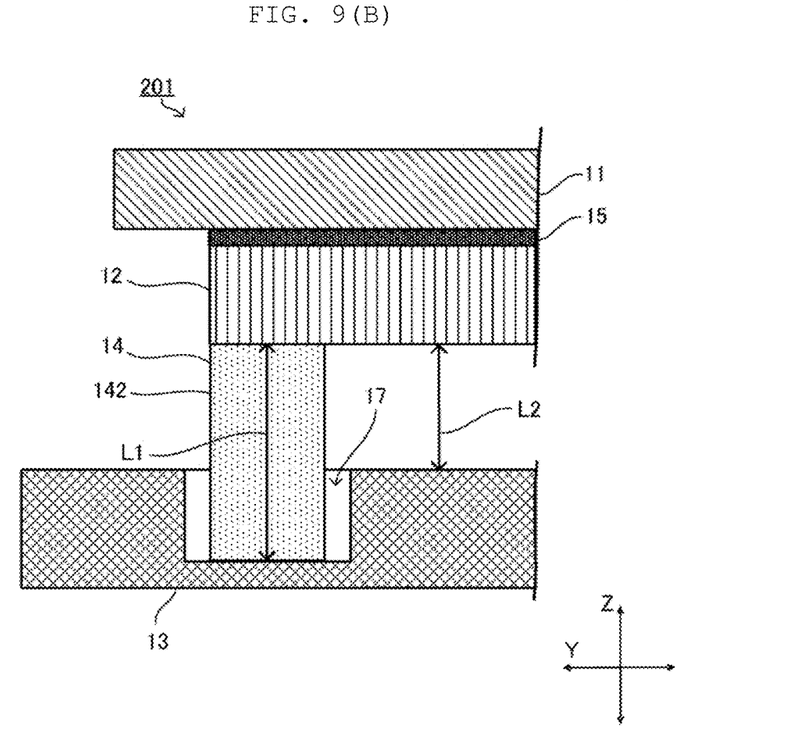
FIG. 9(B) is an enlarged view of a part of FIG. 9(A).

FIG. 8(A) is an exploded perspective view of a vibration structure 201 according to a fourth embodiment, and FIG. 8(B) is a plan view of the vibration structure 201 viewed from a +Z direction to a −Z direction. FIG. 9(A) is a sectional view taken along line III-III illustrated in FIG. 8(B), and FIG. 9(B) is an enlarged view of a part of FIG. 9(A). In FIG. 8(B), members overlapping a substrate 11, when the substrate 11 is viewed in a transmissive manner, are indicated by broken lines. In the description of the fourth embodiment, only portions different from the first embodiment will be described, and the rest will be omitted.

As illustrated in FIGS. 8(A), 8(B), and 9(A), the vibration structure 201 of the present embodiment includes the substrate 11, a vibrator 12, a housing 13, a cushion material 14, and a double-sided tape 15. The vibrator 12 is connected to a first main surface 18 of the substrate 11 with the double-sided tape 15 interposed therebetween. The vibrator 12 constitutes a vibration unit together with the substrate 11.

The housing 13 is connected to the vibrator 12 with the cushion material 14 interposed therebetween. An outer periphery of the cushion material 14 overlaps an outer periphery of the vibrator 12 in a plan view. Note that the cushion material 14 only needs to overlap a frame member 36 of the vibrator 12 in a plan view.

As described above, a member held by the housing may be the vibrator 12.

As illustrated in FIG. 9(B), a recess 17 is formed in the housing 13. Since the recess 17 is formed, the cushion material 14 is connected to the housing 13 in a state where a part of the cushion material 14 enters the housing 13. As a result, the thickness of the entire vibration structure 201 in a Z-axis direction can be reduced as compared with the case where the recess 17 is not formed in the housing 13, and the bulkiness of the vibration structure 201 can be suppressed.

The thickness L1 of the cushion material 14 in the Z-axis direction is greater than the length L2 of a gap between the vibrator 12 and the housing 13. That is, the thickness L1 of the cushion material 14 in the Z-axis direction can be ensured to be equal to or greater than the length L2 of the gap between the vibrator 12 and the housing 13. As a result, the cushion material 14 can suppress the restraint on the substrate 11 by the housing 13.

Finally, the description of the present embodiments should be considered in all respects as illustrative and not restrictive. The scope of the present invention is indicated not by the above-described embodiments but by the claims. Furthermore, the scope of the present invention is intended to include all modifications within the meaning and scope equivalent to the claims.

DESCRIPTION OF REFERENCE SYMBOLS

11: Substrate
12: Vibrator
13: Housing
14, 24, 34: Cushion material (cushioning material)
15: Double-sided tape
16: Cavity
17, 47: Recess (cutout)
18: First main surface
19: Second main surface
27, 37: Step (cutout)
101, 102, 103, 104, 105, 201: Vibration structure L1: Thickness (thickness in direction orthogonal to plane direction of cushioning material)
L2: Length (length of gap between member held by housing and housing)

The invention claimed is:

1. A vibration structure comprising:
a member having a vibrator configured to vibrate along a plane direction;
a housing configured to hold the member, the housing having a recess; and
a cushioning material in the recess and connecting the housing to the member,
wherein a thickness of the cushioning material in a direction orthogonal to a plane direction of the housing is greater than a length of a gap between the member and the housing, and
wherein a width of the recess in the plane direction is larger than a width of the cushion material in the plane direction such that a side surface of the cushion material is not restrained by a side surface of the recess.

2. The vibration structure according to claim 1, wherein the member includes:
a flat plate having a first main surface and a second main surface, and
wherein the vibrator is connected to the first main surface of the flat plate.

3. The vibration structure according to claim 2, wherein the housing has a cavity at a position overlapping the flat plate in a plan view of the vibration structure,
the cushioning material is connected to the housing and the second main surface of the flat plate, and
the length of the gap is between the second main surface of the flat plate and the housing.

4. The vibration structure according to claim 3, wherein the cushioning material is disposed at a position separated from the cavity by a predetermined distance in the plan view.

5. The vibration structure according to claim 3, wherein the cushioning material is disposed along the cavity in the plan view.

6. The vibration structure according to claim 3, wherein the cushioning material surrounds the cavity in the plan view.

7. The vibration structure according to claim 1, wherein the recess has a sectional shape that expands in a direction from the housing toward the member.

8. The vibration structure according to claim 1, wherein the cushion material has a sectional shape that changes in a direction from the housing toward the member.

9. The vibration structure according to claim 8, wherein the sectional shape of the cushion material is thicker at respective ends thereof in contact with the housing and the member than at a center thereof.

10. The vibration structure according to claim 8, wherein the sectional shape of the cushion material is a tapered shape.

11. The vibration structure according to claim 10, wherein the tapered shape of the cushion material is thicker at an end thereof in contact with the member.

12. The vibration structure according to claim 1, wherein the member includes:
a flat plate having a first main surface and a second main surface, and
wherein the vibrator is connected to the first main surface of the flat plate.

13. The vibration structure according to claim 12, wherein the cushioning material is connected to the housing and the vibrator, and the length of the gap is between the vibrator and the housing.

14. The vibration structure according to claim 1, wherein the cushioning material is connected to the housing and the vibrator, and the length of the gap is between the vibrator and the housing.

* * * * *